Sept. 20, 1955      YOSHIKAZU DOI      2,718,174

HIGH APERTURE PHOTOGRAPHIC OBJECTIVE

Filed June 21, 1954

United States Patent Office 2,718,174
Patented Sept. 20, 1955

2,718,174

HIGH APERTURE PHOTOGRAPHIC OBJECTIVE

Yoshikazu Doi, Odawara City, Japan, assignor to Fuji Photo Film Co., Ltd., Minami-Ashigarakami-gun, Kanagawa Prefecture, Japan, a company of Japan Application June 21, 1954, Serial No. 438,184

Claims priority, application Japan June 25, 1953

2 Claims. (Cl. 88—57)

This invention relates to lenses and more particularly to high aperture lenses.

As high aperture photographic objectives available for use at picture angles up to about 45° there are at present those having aperture ratios of F:1.5 and F:1.4. However these lenses are subject to certain difficulties in the correction of higher order aberrations and there exists a difficult problem as to how to increase the aperture ratio without increasing the aberrations of a lens system.

An object of this invention is therefore to provide a photographic objective which improves aberration conditions of lens systems and which is capable of having larger aperture ratios than heretofore known.

It has been found in the present invention that, though the aperture ratio is increased to F:1.3 or F:1.2 as will be shown in the embodiment described hereinafter, the spherical aberration, coma, astigmatism and field curvature are no different from those of the hitherto known F:1.5 lenses and that the higher order spherical aberration, coma and wing shape aberration (flügelfehler) effected in oblique pencil are far better corrected than some of the best lenses now known. Further, an optical design is attained which provides good results with respect to the chromatic differences of various aberrations.

Embodiments of the invention are illustrated, by way of example, in the accompanying drawing, wherein.

Figure 1:
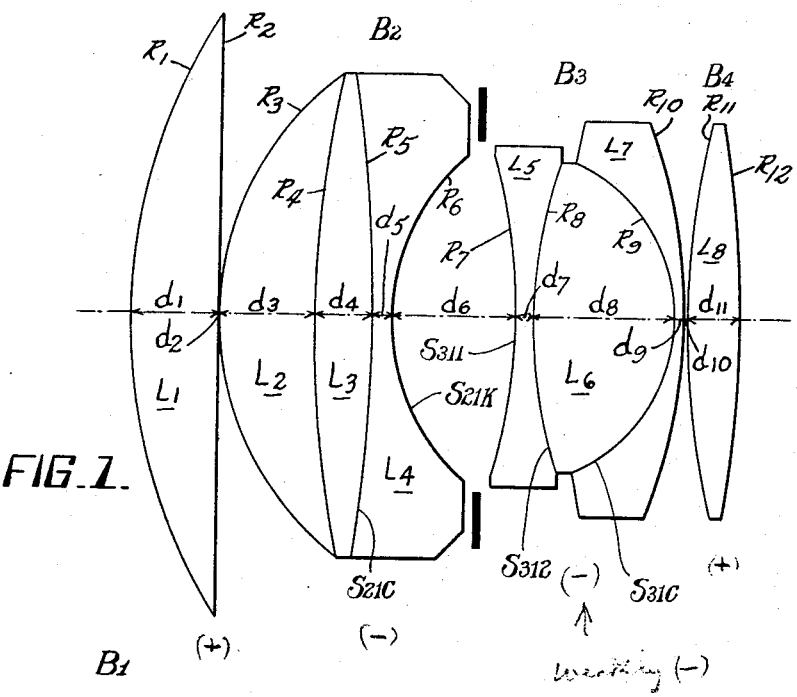
Fig. 1 is a sectional side-view of a high aperture lens in accordance with a preferred embodiment of the invention.

As shown in the drawing, an objective comprises four glass members $B_1$, $B_2$, $B_3$ and $B_4$ (the suffixes being consecutively numbered from the side directed toward the object). The glass members $B_1$ and $B_4$ consist of one or two collective components respectively; $B_2$ consists of one dispersive meniscus component with its convex exterior surface towards the object and comprising three or more elements namely single lenses cemented together; $B_3$ consists of one meniscus component with its concave exterior surface towards the object and comprising three or more elements cemented together. In the objective of this type, each refractive surface being called $S_j$, the refractive indexes of the incident and refractive sides to the $d$ line of the refractive surface $S_j$ being denoted by $N_j$ and $N'_j$ respectively, the refractive surface of $B_2$ facing $B_3$ and contacting air by $S_{21k}$, the refractive surface of $B_3$ facing $B_2$ and contacting air and the successive refractive surface by $S_{311}$ and $S_{312}$ respectively, the radius of curvature of the refractive surface by $R$, and the equivalent focal length of the objective by $f'_T$, the following Conditions I, II and III can be fulfilled as follows:

There are relations showing:

$$2.5 < \frac{f'_T}{R_{21k}} < 4.5 \qquad -2.0 < \frac{f'_T}{R_{311}} < -1.0 \quad (I)$$

$$0.3 < \frac{R_{21k}}{R_{312}} < 0.8 \qquad 0.09 < (N'_{312} - N_{312})$$

and there is provided in $B_2$ a surface $S_{21c}$ indicating $$-1.2 < \frac{f'_T}{R_{21c}} < 0.1 \qquad 0.10 < (N'_{21c} - N_{21c}) \quad (II)$$

and in $B_3$ a surface $S_{31c}$ indicating $$-1.6 < \frac{R_{21k}}{R_{31c}} < -0.9 \qquad -0.10 < (N'_{31c} - N_{31c}) < -0.01 \quad (III)$$

Thus $S_{21c}$, $S_{21k}$ and $S_{311}$ are obtained as dispersive surfaces. As a consequence the correction of various aberrations is effected under favourable conditions; that is, the spherical aberration and Petzval sum are corrected, and the most important and satisfactory result is attained in the surface $S_{312}$ for correction of the higher order coma of oblique pencil. Further; the surface $S_{31c}$ produces the sixth order axial spherical aberration of the aperture to compensate the influence of the fourth order axial spherical aberration. Improvement in the correction of various aberrations of the lens system can be effected by dividing, if desired, $B_1$ and $B_4$ into two collective components to prevent dispersive surfaces $S_{21c}$, $S_{21k}$ and $S_{311}$ of $B_2$ and $B_3$ from aggrandizement of the correcting action of the spherical aberration.

In the embodiment the ordinary optical glass BaF10 was employed as the main component of the positive lens for F:1.3 and new optical glass such as SSK10, SK21, etc. as the main component for F:1.2.

It is obvious according to the invention that the function as well as the aperture ratio can be much improved by using an optical glass such as EK330, EK210, etc. having greater refractive (N) and dispersive (V) indexes as compared with that used in the embodiment.

An example of a lens system in accordance with the invention is shown in Figure 1 and described in the following table. The refractive surfaces are numbered from the side toward the object and R is the radius of curvature; the + and − signs designate that surfaces are either convex or concave towards the object; and $d$, $N'$, $V'$ and $f'_T$ refer respectively to the thickness or space, the refractive index for the $d$ line, the Abbe number and the focal length of the objective.

[$f'_T = .9500$]

| | | | |
|---|---|---|---|
| $R_1 = +\ .8201$ | $d_1 = .120$ | $N' = 1.6713$ | $V' = 47.0$ |
| $R_2 = +60.83$ | $d_2 = .004$ | | |
| $R_3 = +\ .4244$ | $d_3 = .122$ | $N' = 1.6713$ | $V' = 47.0$ |
| $R_4 = +\ 1.3983$ | $d_4 = .083$ | $N' = 1.5414$ | $V' = 47.1$ |
| $R_5 = -\ 2.1219$ | $d_5 = .026$ | $N' = 1.7572$ | $V' = 27.5$ |
| $R_6 = +\ .2829$ | $d_6 = .1800$ | | |
| $R_7 = -\ .6576$ | $d_7 = .0180$ | $N' = 1.5414$ | $V' = 47.1$ |
| $R_8 = +\ .5712$ | $d_8 = .1931$ | $N' = 1.6738$ | $V' = 47.0$ |
| $R_9 = -\ .2386$ | $d_9 = .0181$ | $N' = 1.6480$ | $V' = 47.8$ |
| $R_{10} = -\ .7700$ | $d_{10} = .004$ | | |
| $R_{11} = +\ 1.241$ | $d_{11} = .070$ | $N' = 1.6216$ | $V' = 60.2$ |
| $R_{12} = -\ 2.096$ | | | |

Figure 2:
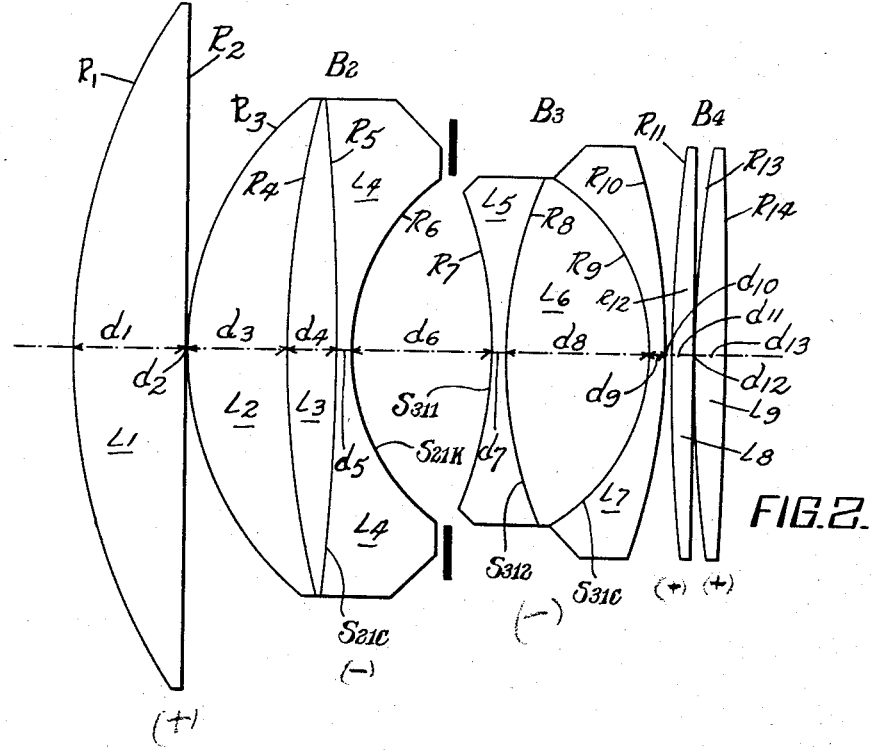
Fig. 2 is a similar representation of another embodiment of the invention.

A second example of a lens system of the invention is shown in Figure 2 wherein is illustrated an arrangement of lenses L1–9 for F:1.2. The table below gives the parimeters of the system including the radii of curvature (Rn) and the axial dimensions (dn) noted in Figure 2.

[$f'_T=0.9200$]

| | | | |
|---|---|---|---|
| $R_1 =+ .8714$ | $d_1 =.150$ | $N'=1.7234$ | $V'=38.0$ |
| $R_2 =+27.322$ | $d_2 =.004$ | | |
| $R_3 =+ .4278$ | $d_3 =.132$ | $N'=1.6935$ | $V'=53.3$ |
| $R_4 =+ 1.2987$ | $d_4 =.073$ | $N'=1.5101$ | $V'=63.5$ |
| $R_5 =- 3.7037$ | $d_5 =.026$ | $N'=1.7618$ | $V'=26.5$ |
| $R_6 =+ .2848$ | $d_6 =.185$ | | |
| $R_7 =- .6667$ | $d_7 =.020$ | $N'=1.5112$ | $V'=50.9$ |
| $R_8 =+ .6250$ | $d_8 =.205$ | $N'=1.6935$ | $V'=53.3$ |
| $R_9 =- .2535$ | $d_9 =.020$ | $N'=1.6583$ | $V'=57.1$ |
| $R_{10}=- .9076$ | $d_{10}=.004$ | | |
| $R_{11}=+ 1.7544$ | $d_{11}=.033$ | $N'=1.7234$ | $V'=38.0$ |
| $R_{12}=\infty$ | $d_{12}=.004$ | | |
| $R_{13}=+ 2.2727$ | $d_{13}=.040$ | $N'=1.6935$ | $V'=53.3$ |
| $R_{14}=- 4.4313$ | | | |

$S_{21k}$ ------------ $S_6$
$S_{311}$ ------------ $S_7$
$S_{312}$ ------------ $S_8$
$S_{21c}$ ------------ $S_5$
$S_{31c}$ ------------ $S_9$

It will be understood that by calculating the numerical values shown above the aforementioned Conditions I, II and III as requisite of this invention are fulfilled.

What is claimed is:

1. A high aperture photographic objective comprising four glass members $B_1$, $B_2$, $B_3$ and $B_4$, each suffix of those symbolic letters being numerated from the side of the object; $B_1$ and $B_4$ having one collective component comprising a single positive lens respectively; $B_2$ consisting one dispersive meniscus component with its convex exterior surface towards the object and comprising three elements cemented together, $B_3$ consisting one meniscus component with its concave exterior surface towards the object and comprising three elements cemented together, characterized in that the relation of value for $f'_T=0.95$ is shown in the following table:

[$f'_T=.9500$]

| | | | |
|---|---|---|---|
| $R_1 =+ .8201$ | $d_1 =.120$ | $N'=1.6713$ | $V'=47.0$ |
| $R_2 =+60.83$ | $d_2 =.004$ | | |
| $R_3 =+ .4244$ | $d_3 =.122$ | $N'=1.6713$ | $V'=47.0$ |
| $R_4 =+ 1.3983$ | $d_4 =.083$ | $N'=1.5414$ | $V'=47.1$ |
| $R_5 =- 2.1219$ | $d_5 =.026$ | $N'=1.7572$ | $V'=27.5$ |
| $R_6 =+ .2829$ | $d_6 =.1800$ | | |
| $R_7 =- .6576$ | $d_7 =.0180$ | $N'=1.5414$ | $V'=47.1$ |
| $R_8 =+ .5712$ | $d_8 =.1931$ | $N'=1.6738$ | $V'=47.0$ |
| $R_9 =- .2386$ | $d_9 =.0181$ | $N'=1.6480$ | $V'=47.8$ |
| $R_{10}=- .7700$ | $d_{10}=.004$ | | |
| $R_{11}=+ 1.241$ | $d_{11}=.070$ | $N'=1.6216$ | $V'=60.2$ |
| $R_{12}=- 2.096$ | | | |

Wherein numerals in the first column designate the refractive surfaces numbered from the side of the object and R is the radius of curvature, the + and − signs designating that surfaces are respectively convex and concave towards the object, and $d$, $N'$, $V'$ and $f'_T$ refer respectively to the thickness or space, the refractive index for the $d$ line, the Abbe number and the focal length of the objective.

2. A high aperture photographic objective comprising four glass members $B_1$, $B_2$, $B_3$ and $B_4$, each suffix of those symbolic letters being numerated from the side of the object; $B_1$ having one collective component comprising a single positive lens; $B_2$ consisting one dispersive meniscus component with its convex exterior surface towards the object and comprising three elements cemented together, $B_3$ consisting one meniscus component with its concave exterior surface towards the object and comprising three elements cemented together, and $B_4$ having two collective components comprising a single positive lens respectively, characterized in that the relation of value for $f'_T=0.92$ is shown in the following table:

[$f'_T=0.9200$]

| | | | |
|---|---|---|---|
| $R_1 =+ .8714$ | $d_1 =.150$ | $N'=1.7234$ | $V'=38.0$ |
| $R_2 =+27.322$ | $d_2 =.004$ | | |
| $R_3 =+ .4278$ | $d_3 =.132$ | $N'=1.6935$ | $V'=53.3$ |
| $R_4 =+ 1.2987$ | $d_4 =.073$ | $N'=1.5101$ | $V'=63.5$ |
| $R_5 =- 3.7037$ | $d_5 =.026$ | $N'=1.7618$ | $V'=26.5$ |
| $R_6 =+ .2848$ | $d_6 =.185$ | | |
| $R_7 =- .6667$ | $d_7 =.020$ | $N'=1.5112$ | $V'=50.9$ |
| $R_8 =+ .6250$ | $d_8 =.205$ | $N'=1.6935$ | $V'=53.3$ |
| $R_9 =- .2535$ | $d_9 =.020$ | $N'=1.6583$ | $V'=57.1$ |
| $R_{10}=+ .9076$ | $d_{10}=.004$ | | |
| $R_{11}=+ 1.7544$ | $d_{11}=.033$ | $N'=1.7234$ | $V'=38.0$ |
| $R_{12}=\infty$ | $d_{12}=.004$ | | |
| $R_{13}=+ 2.2727$ | $d_{13}=.040$ | $N'=1.6935$ | $V'=53.3$ |
| $R_{14}=- 4.4313$ | | | |

Wherein numerals in the first column designate the refractive surfaces numbered from the side of the object and R is the radius of curvature, the + and − signs designating that surfaces are respectively convex and concave towards the object, and $d$, $N'$, $V'$ and $f'_T$ refer respectively to the thickness or space, the refractive index for the $d$ line, the Abbe number and the focal length of the objective.

References Cited in the file of this patent

UNITED STATES PATENTS

| 1,708,863 | Bertele | Apr. 9, 1929 |
| 1,779,257 | Lee | Oct. 21, 1930 |
| 2,186,621 | Bertele | Jan. 9, 1940 |
| 2,645,973 | Ito | July 21, 1953 |

FOREIGN PATENTS

| 553,844 | Great Britain | June 8, 1943 |